United States Patent
Dieckmann et al.

(10) Patent No.: US 8,991,536 B2
(45) Date of Patent: Mar. 31, 2015

(54) PRESSURE CONTROL DEVICE AND METHOD FOR CONTROLLING PRESSURE IN A VEHICLE

(75) Inventors: Thomas Dieckmann, Pattensen (DE); Ingo Stumberg, Hannover (DE); Christian Wiehen, Burgwedel (DE)

(73) Assignee: WABCO GmbH, Hannover (DE)

( * ) Notice: Subject to any disclaimer, the term of this patent is extended or adjusted under 35 U.S.C. 154(b) by 47 days.

(21) Appl. No.: 14/002,193

(22) PCT Filed: Mar. 5, 2012

(86) PCT No.: PCT/EP2012/000979
§ 371 (c)(1),
(2), (4) Date: Aug. 29, 2013

(87) PCT Pub. No.: WO2012/119752
PCT Pub. Date: Sep. 13, 2012

(65) Prior Publication Data
US 2013/0333969 A1     Dec. 19, 2013

(30) Foreign Application Priority Data
Mar. 9, 2011   (DE) .......................... 10 2011 013 440

(51) Int. Cl.
*B60K 6/12* (2006.01)
*B60T 1/10* (2006.01)
*B60T 17/02* (2006.01)

(52) U.S. Cl.
CPC ... *B60K 6/12* (2013.01); *B60T 1/10* (2013.01); *B60T 17/02* (2013.01); *B60K 2006/123* (2013.01); *Y02T 10/6208* (2013.01)

USPC ............ 180/68.5; 188/151 R; 60/414; 60/416

(58) Field of Classification Search
CPC ........... B60T 1/10; B60T 17/02; B60T 13/58; B60T 13/68; B60K 6/08; B60K 6/12; B60K 2006/123; F04B 35/002; Y02T 10/6208
USPC ............ 180/165; 60/408, 413, 414, 416, 418; 188/151 R
See application file for complete search history.

(56) References Cited

U.S. PATENT DOCUMENTS 4,290,268 A * 9/1981 Lowther .......................... 60/668
4,355,508 A * 10/1982 Blenke et al. ................... 60/416

(Continued)

FOREIGN PATENT DOCUMENTS

| DE | 196 00 910 | 6/1996 | |
|---|---|---|---|
| DE | 10 2010 033 539 A1 | 11/2011 | |
| JP | 05262160 A * | 10/1993 | ............. B60K 25/00 |

*Primary Examiner* — J. Allen Shriver, II
*Assistant Examiner* — Steve Clemmons
(74) *Attorney, Agent, or Firm* — Kramer Levin Naftalis & Frankel LLP

(57) ABSTRACT

To lower the fuel consumption of a vehicle having a pneumatic brake system during operation of the vehicle by utilizing existing components to their full capacity, thus contributing to energy conservation, a method and device for controlling pressure is provided, wherein modes of compressed air expansion are provided. In a second compressed-air expansion mode, compressed air is channeled from a second compressed-air storage container to the compression chamber of the air compressor during expansion phases of the air compressor. In a third compressed-air expansion mode, compressed air is channeled from a third compressed-air storage container to the compression chamber of the air compressor during expansion phases of the air compressor.

18 Claims, 6 Drawing Sheets

(56) References Cited

U.S. PATENT DOCUMENTS

| | | | |
|---|---|---|---|
| 4,478,304 A * | 10/1984 | Delano | 180/165 |
| 4,798,053 A * | 1/1989 | Chang | 60/712 |
| 6,223,846 B1 * | 5/2001 | Schechter | 180/165 |
| 6,363,723 B1 * | 4/2002 | Negre et al. | 60/712 |
| 6,629,573 B1 * | 10/2003 | Perry | 180/54.1 |
| 6,793,029 B2 * | 9/2004 | Ching | 180/165 |
| 6,922,997 B1 * | 8/2005 | Larson et al. | 60/611 |
| 7,216,735 B2 * | 5/2007 | Gonzalez Mena | 180/165 |
| 7,231,998 B1 * | 6/2007 | Schechter | 180/165 |
| 7,344,201 B1 * | 3/2008 | Bates | 303/57 |
| 7,789,181 B1 * | 9/2010 | Schechter | 180/165 |
| 8,061,132 B2 * | 11/2011 | Fong et al. | 60/417 |
| 8,402,759 B2 * | 3/2013 | Rathke et al. | 60/413 |
| 8,448,433 B2 * | 5/2013 | McBride et al. | 60/508 |
| 2001/0002379 A1 * | 5/2001 | Schechter | 477/115 |
| 2001/0047654 A1 * | 12/2001 | Rush et al. | 60/413 |
| 2004/0173396 A1 * | 9/2004 | Rush et al. | 180/165 |
| 2006/0108860 A1 * | 5/2006 | Stragier | 303/15 |
| 2008/0314664 A1 * | 12/2008 | Mueller et al. | 180/165 |
| 2010/0000806 A1 * | 1/2010 | Caudill | 180/65.21 |
| 2010/0095661 A1 | 4/2010 | Hemphill et al. | |
| 2010/0314186 A1 * | 12/2010 | Ma | 180/165 |
| 2011/0162903 A1 * | 7/2011 | Stragier | 180/165 |
| 2011/0200455 A1 * | 8/2011 | Jordan et al. | 417/53 |
| 2013/0004339 A1 | 1/2013 | Eisfelder et al. | |

* cited by examiner

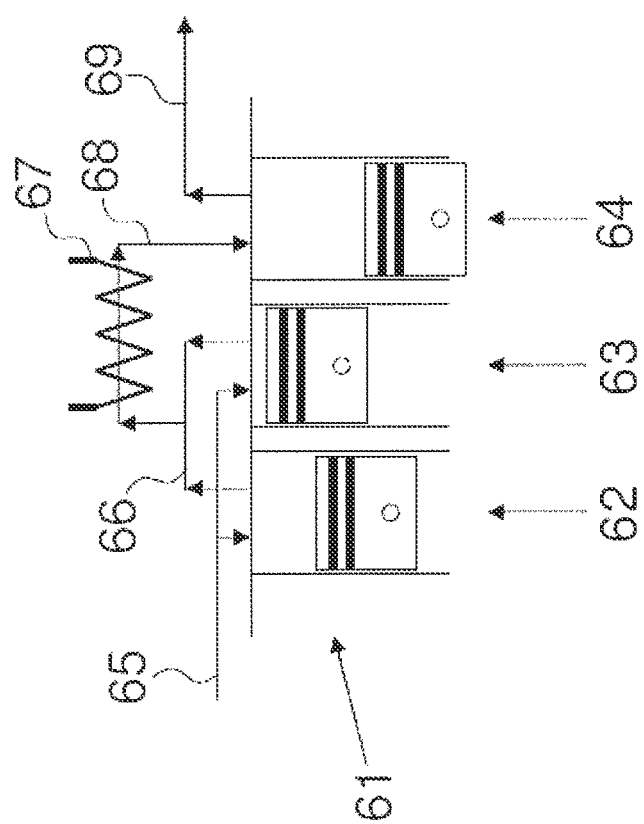

US 8,991,536 B2

PRESSURE CONTROL DEVICE AND METHOD FOR CONTROLLING PRESSURE IN A VEHICLE

FIELD OF THE INVENTION

The invention generally concerns a method and pressure control device for pressure control in a vehicle with a pneumatic brake system.

BACKGROUND OF THE INVENTION

DE 196 00 910 A1 discloses a method for storing and recovering braking energy in motor vehicles equipped with an air compressor, an air store and an internal combustion engine, wherein the air compressor, which operates in accordance with the positive-displacement principle, is driven by the internal combustion engine during overrun operation, and serves for supercharging during normal operation. For braking the vehicle, the air compressor delivers air into the air store through a valve and via a heat exchanger provided for cooling. The stored air is, as required, conducted through a valve and via a further heat exchanger provided for heating, and supplied at the inlet side to the air compressor, which outputs mechanical energy to the internal combustion engine, wherein the air that is expanded in the air compressor is supplied to the internal combustion engine.

SUMMARY OF THE INVENTION

Generally speaking, it is an object of the present invention to reduce the energy consumption of a vehicle with a pneumatic brake system during driving, with maximum possible use of existing components, thus contributing to fuel savings.

The air compressor provided in vehicles with pneumatic brake systems can also be operated in an expansion mode in which, in expansion phases, compressed air is conducted into the compression chamber of the air compressor. In the case of a piston compressor with the compression chamber lying above the piston, an expansion phase is present when the piston moves from a top dead center to a bottom dead center. During the movement from the bottom dead center to the top dead center, a compression phase is present in which the air in the compression chamber is compressed, producing compressed air. When the air compressor is however not operated to generate compressed air because, e.g., the compressed air accumulator or accumulators are sufficiently filled, in the expansion phases, the compressed air can be supplied to the air compressor to support its movement in the direction of the bottom dead center and thus support a drive motor of the vehicle coupled to the air compressor when driving the vehicle.

In a method according to an embodiment of the present invention, in addition to a first compressed-air expansion mode, at least one or both of the following compressed-air expansion modes can be realized:

(i) a second compressed-air expansion mode, in which, in expansion phases of the air compressor, compressed air is conducted from a second compressed-air storage container into the compression chamber of the air compressor; and (ii) a third compressed-air expansion mode, in which, in expansion phases of the air compressor, compressed air is conducted from a third compressed-air storage container into the compression chamber of the air compressor.

Here, a universally applicable method is proposed which allows both the storage in an accumulator of compressed air generated in the overrun phases of the vehicle by the air compressor and later use of this air in phases with increased drive power demand to support the drive of the vehicle. In addition, the waste heat generated during operation of the vehicle, e.g., from the drive motor and exhaust system, can be utilized with regard to the energy available therein to further support the vehicle drive. In addition to the first compressed-air expansion mode, at least the second or third compressed-air expansion mode is provided. Also, all three compressed-air expansion modes can be provided. In this case, maximum energy efficiency can be achieved. If both the second and also the third compressed-air expansion modes are provided, the system has both the second and also the third compressed-air storage containers. If only the second compressed-air expansion mode is provided, the system may also be implemented without the third compressed-air storage container. If only the third compressed-air expansion mode is provided, the system may also be implemented without the second compressed-air storage container.

In general terms, a compressed-air generation mode can mean that the compressed-air compressor is utilized for compressed-air generation, wherein the generated compressed air is stored in a compressed-air storage container and, if required, is simultaneously also utilized for pneumatic actuations, for example of the brake cylinders. In a compressed-air generation mode, compressed air generated in compression phases of the compressed-air compressor is conducted from the compression chamber of the compressed-air compressor into a compressed-air storage container, for example into the brake circuit compressed-air container.

A compressed-air expansion mode can mean that, in the expansion phases, compressed air is supplied to the compressed-air compressor from a compressed-air storage container (first, second or third compressed-air storage container) in order to assist the movement thereof, such that the compressed-air compressor acts as a motor and outputs mechanical work. In this way, it is possible, for example, for a drive engine, which is coupled to the compressed-air compressor, of the vehicle to be assisted in driving the vehicle, such that fuel can be saved. In a compressed-air expansion mode, in expansion phases of the compressed-air compressor, compressed air is conducted from a compressed-air storage container into the compression chamber of the compressed-air compressor.

The second and third compressed-air storage containers can be formed as compressed-air containers. Advantageously, the second and/or third compressed-air storage containers are provided in the vehicle as additional components that are not part of the pneumatic brake system. This has the advantage that the second and/or the third compressed-air storage containers can be optimized in regard to their primary application in the second or third compressed-air expansion mode, and need not be configured in relation to the peripheral conditions of the pneumatic brake system. Thus, the second and/or third compressed-air storage container can be formed as high pressure containers adapted for substantially higher pressure levels than the brake pressure compressed-air container.

The first, the second and the third compressed-air storage containers can, in each case, be different containers that form different pressure circuits and have different pressures. The containers may, however, be structurally combined to form one or more structural units. The first, second and/or third compressed-air storage containers may, in each case, also be formed by means of a pneumatic interconnection of multiple individual containers.

According to an embodiment of the invention, in a first overrun phase in operation of the vehicle, the air compressor can be operated in the first compressed-air generating mode. This has the advantage that, in the overrun phase, the brake circuit compressed-air container is filled with compressed air so that more compressed air is available for subsequent compressed air extraction processes. The use of an overrun phase for operating the air compressor in a compressed-air generating mode has the advantage that the surplus kinetic energy of the vehicle can sensibly be used for driving the air compressor without energy needing to be consumed from the fuel used to operate the drive motor of the vehicle. An overrun phase is detected, for example, when the vehicle driver wishes to decelerate the vehicle or on a hill descent. An overrun phase is indicated, for example, by negative values of the engine torque of the drive motor, an inactivated gas pedal position or an activated brake pedal position.

According to another embodiment, in a second compressed-air generating mode, compressed air generated in compression phases of the air compressor is conducted from the compression chamber of the air compressor into the second compressed-air storage container. This has the advantage that the air compressor can also be used for filling the second compressed-air storage container so that no further air compressor is required.

According to yet another embodiment of the invention, in a second overrun phase in operation of the vehicle, the air compressor is operated in the second compressed-air generating mode. The use of an overrun phase also has the advantages already described above in relation to the first compressed-air generating mode. In the second overrun phase therefore, the second compressed-air storage container is filled with compressed air without fuel needing to be consumed for this.

The first and second overrun phases in operation of the vehicle can in principle be arbitrary overrun phases, wherein the terms "first" and "second" do not establish any temporal sequence or priority, but merely provide a linguistic distinction. In particular, the invention also includes the possibility that in sustained overrun phases, switching between the first and second compressed-air generating mode takes place as required, where applicable repeatedly.

According to a further embodiment, operation in the second compressed-air generating mode occurs only when a predefined minimum pressure is present in the brake circuit compressed-air container. Alternatively, operation in the second compressed-air generating mode occurs only when the brake circuit compressed-air container is filled to its maximum pressure. This ensures a priority compressed-air filling of the brake circuit compressed-air container, which is advantageous for safe operation of the compressed-air brake system.

According to a still further embodiment, the second compressed-air storage container is an additional compressed-air container, which is provided in addition to the brake system compressed-air containers and, where applicable, further compressed-air containers in a pneumatic brake system of a utility vehicle. The additional compressed-air container is therefore added to the vehicle as a further component, without this being necessary for the pneumatic brake system. Therefore, the additional compressed-air container can be optimized for its primary application for the second compressed-air expansion mode and its configuration is not subject to the requirements for compressed-air brake systems. Advantageously, the additional compressed-air container can be formed as a high-pressure container adapted for a pressure level of 20 bar, where applicable also 30 or 35 bar.

According to another embodiment, the third compressed-air storage container is a heat exchanger, which, in the third compressed-air expansion mode on the input side, is filled with compressed air output from the air compressor in the compression phases, while on the output side of the heat exchanger, heated compressed air is supplied back to the compression chamber of the air compressor in the expansion phases. This allows a recirculation operation of compressed air through the heat exchanger in which the heat exchanger temporarily receives the compressed air at its input connection and, at the same time, at an output connection, provides heated compressed air to the air compressor for the next expansion phase. By this recirculation operation, the air compressor connected to the drive motor can run autonomously as a motor and thus can emit an amount of drive energy to the drive motor of the vehicle. By the selection of suitable parameters, in this way, an air compressor normally provided in a utility vehicle with a compressed-air brake system can generate additional drive power from the waste heat from the drive motor.

In another embodiment of the invention, the heat exchanger is thermally coupled with the drive motor or the exhaust system, e.g., an exhaust pipe. The heat exchanger can be formed as a helically bent pipe, which is wound around the exhaust pipe. In another embodiment, the heat exchanger and the components of the drive motor or exhaust system emitting heat to the heat exchanger can be thermally isolated from the environment.

In yet another embodiment of the invention, before initiation of the third compressed-air expansion mode, from the exhaust gas temperature and/or exhaust gas quantity of the drive motor, it can be estimated how much additional power can be generated by the air compressor in the third compressed-air expansion mode. The third compressed-air expansion mode is then initiated only when the drive power that can be generated is sufficiently high, e.g., above 0.3 kW. At lower values, the third compressed-air expansion mode is not initiated, in order to protect the air compressor. In particular, the third compressed-air expansion mode is not initiated if the estimation gives negative values.

A method for pressure control in a vehicle can advantageously be achieved using only the third compressed-air expansion mode described above, i.e., without the first and second compressed-air expansion modes described above. The third compressed-air expansion mode, which in this case is the only compressed-air expansion mode, can then be initiated under the conditions described above.

According to an embodiment of the invention, the compressed air output by the air compressor on the output side in the compression phases is generated in a multistage compression process. For this a multistage compressor, e.g., a two-stage compressor can be used. Multistage compression allows the production of a high pressure level on the output side of the air compressor in an energetically favorable manner. In particular, a two-stage compression is advantageous for the recirculation mode described above in the third compressed-air expansion mode. This allows a good compromise between the complexity of the device for producing compressed air, energy efficiency and the pressure level that can be generated.

According to another embodiment of the invention, between at least two compression stages of the multistage compression process, the compressed air is conducted through a cooler in which the compressed-air temperature is reduced. This allows a manner of intermediate cooling of the compressed air. Due to the intermediate cooling, after a first compression stage, the compressed-air temperature can be lowered to a level acceptable for the second compression stage. This has the advantage that the entire compression process can be approximated to an isothermic compression process that allows a particularly energy-efficient operation of the air compressor. The cooler can, for example, be a water-cooling circuit in the cylinder head of a two-stage air compressor.

According to a further embodiment of the invention, operation in the third compressed-air expansion mode takes place only when a predefined minimum pressure is present in the brake circuit compressed-air container. Alternatively, operation in the third compressed-air expansion mode takes place only when the brake circuit compressed-air container is filled to its maximum pressure. This ensures a permanently adequate, priority filling of the brake circuit compressed-air container by the air compressor.

According to a still further embodiment, operation in the third compressed-air expansion mode takes place only when a predefined minimum pressure is present in the second compressed-air storage container or when the second compressed-air storage container is filled to its maximum pressure. This guarantees a priority compressed-air filling of the second compressed-air storage container before the third compressed-air storage container. In particular, when the third compressed-air storage container is formed as a heat exchanger, the recirculation mode described above is thus initiated as second priority only after filling of the first and second compressed-air storage containers with compressed air. Thus, in overrun phases, the maximum possible quantity of energy can be recovered in the form of stored compressed air and output again to the drive motor in a later phase when drive power is demanded.

According to another embodiment, in a phase with a demand for drive power in operation of the vehicle, either the first compressed-air expansion mode, the second compressed-air expansion mode or the third compressed-air expansion mode is activated, the second compressed-air expansion mode is activated as priority before the first compressed-air expansion mode, and the second compressed-air expansion mode is activated as priority before the third compressed-air expansion mode. This maximizes the energy efficiency, since more additional power can be generated due to the support by compressed air from a compressed-air storage container than due to the recirculation operation.

According to a further embodiment, when the pressure in the first compressed-air storage container reaches or falls below a minimum pressure threshold, before initiating the first compressed-air generating mode, by analysis of satellite navigation information and digital map data, a determination is made as to whether, on the basis of an immediately preceding road section, an impending overrun phase in operation of the vehicle can be detected, and, if so, the initiation of the first compressed-air generating mode is delayed until the impending overrun phase occurs. This allows a manner of predictive inclusion of the development of the road section ahead in the use of the air compressor for compressed-air generation. Indeed, the pressure may fall slightly below the minimum pressure threshold provided, but the advantage is achieved that the air compressor is used for compressed air generation only in an overrun phase, and in a phase with drive power demand, no additional energy is already consumed by the air compressor. To ensure an adequate supply of compressed air to the brake system, the delay in initiation of the first compressed-air generating mode can be interrupted after a time limit, and the first air generating mode can then be initiated.

According to a still further embodiment, the delay in initiation of the first compressed-air generating mode can be interrupted, and the first compressed-air generating mode initiated, if the pressure in the first compressed-air storage container reaches or falls below a lower limit pressure threshold that lies below the minimum pressure threshold. If the pressure falls below the limit pressure threshold, the first compressed-air generating mode is initiated even if no overrun phase is present.

Similarly, the satellite navigation information can also be used for the switch-off threshold of the air compressor. According to another embodiment of the invention, in the second compressed-air generating mode, when the pressure in the second compressed-air storage container reaches or exceeds a maximum pressure threshold, by analysis of satellite navigation information and digital map data, a determination is made as to whether, taking into account a road section immediately ahead, a current overrun phase will persist for a minimum duration, and, if this condition is fulfilled, the air compressor continues to operate in the second compressed-air generating mode until the current overrun phase has ended or the pressure in the second compressed-air storage container reaches or exceeds an upper limit pressure threshold that lies above the maximum pressure threshold. Thus, the overrun phases can also be utilized to the optimal extent in the second compressed-air generating mode.

The invention further concerns a pressure control device for a vehicle with a pneumatic brake system, wherein the vehicle comprises at least the following:
  a) a drive motor to generate a drive power of the vehicle,
  b) the pneumatic brake system for braking the vehicle, comprising at least:
    b1) several compressed-air brake cylinders,
    b2) a compressed-air supply and storage assembly with at least one first compressed-air storage container in the form of a brake circuit compressed-air container, from which one or more compressed-air brake cylinders are pressurized with compressed air on braking of the vehicle, and
    b3) an air compressor that is or can be coupled with the drive motor of the vehicle,
and wherein the pressure control device comprises at least one electronic control unit and at least one valve device that can be controlled by the electronic control unit for controllable connection of the compression chamber of the air compressor to the brake circuit compressed-air container and to at least one or both of the second and third compressed-air storage containers, the electronic control unit including a control program configured to perform a method according to embodiments of the present invention. This advantageously allows a software implementation of the method embodiments.

The recirculation mode, in which quasi-simultaneously compressed air is introduced into the heat exchanger and returned from the heat exchanger to the compression chamber, is also suitable separately for reducing the energy consumption of the vehicle. Here, a reduction in energy consumption of the vehicle, using the waste heat supplied to the heat exchanger, can be achieved also in compressed air systems in which there is no storage of compressed air in a compressed-air container or in which the return of compressed air from such a compressed-air container to the air compressor cannot be implemented for other reasons.

In such embodiments, the third compressed-air storage container can mean the heat exchanger. Consequently, the heat exchanger can, where applicable, be the only compressed-air storage container.

Still other objects and advantages of the present invention will in part be obvious and will in part be apparent from the specification.

The present invention accordingly comprises the features of construction, combination of elements, arrangement of parts, and the various steps and the relation of one or more of such steps with respect to each of the others, all as exemplified in the constructions herein set forth, and the scope of the invention will be indicated in the claims.

BRIEF DESCRIPTION OF THE DRAWINGS

The invention is now explained in more detail below with reference to exemplary embodiments shown in the accompanying drawings, in which:

FIG. 6 illustrates a two-stage compressor process in accordance with an embodiment of the present invention.

In the figures, the same reference numerals are used for corresponding elements.

Also, in the figures, single solid lines are used for compressed air lines, dotted lines for electrical lines, double solid lines for exhaust lines and triple solid lines for mechanical connections, such as, for example, rotating shafts. In FIG. 2, dashed lines are used for the hydraulic circuit guided through the heat exchanger.

Insofar as the electrically actuatable valves shown in the figures carry a symbol for a magnet, this includes all types of electrical actuation, in particular piezoelectric, electromagnetic, electrohydraulic, electropneumatic and electromotorized operation.

DETAILED DESCRIPTION OF THE PREFERRED EMBODIMENTS

Figure 1:
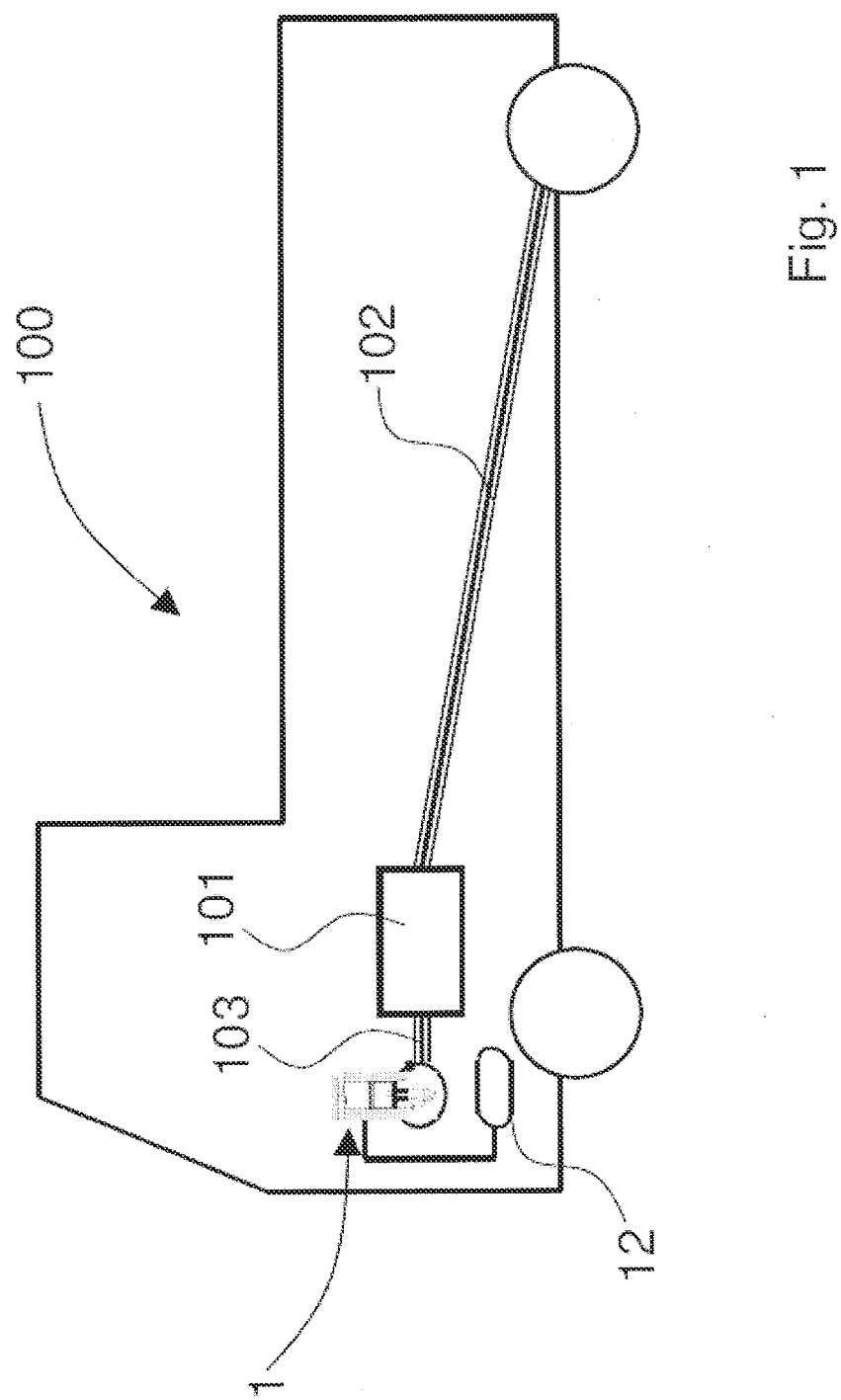
FIG. 1 is a schematic diagram of a vehicle in accordance with an embodiment of the present invention.

FIG. 1 shows a vehicle 100 with a drive motor 101, for example a diesel engine, which can deliver a drive power for driving the vehicle 100 via a drive shaft 102 connected to the rear axle of the vehicle 100 via a cardan shaft. The drive motor 101 is connected via a shaft 103 to an air compressor 1 of the vehicle 100. The shaft 103 serves both as the output shaft from the drive motor 101 and the drive shaft of the air compressor 1. Depending on design, however, a translation between the drive motor and the air compressor can be provided by means of a gearing. Also, a switchable coupling can be provided, through which the connection between the drive motor 101 and the air compressor 1 can be interrupted as required. The air compressor 1 is also connected via a compressed-air line to a compressed-air supply and storage assembly of the vehicle 100, which is symbolized in simplified form in FIG. 1 as a brake circuit compressed-air container 12. The compressed-air supply and storage assembly has, for example, a multicircuit protection valve, an air dryer and, in addition to the brake circuit compressed-air container 12, further compressed-air containers for further brake circuits or other compressed-air circuits of the vehicle. It can be assumed as an example that the brake circuit compressed-air container 12 is the compressed-air container of the first service brake circuit.

The vehicle 100 has a pneumatic brake system that, along with the air compressor 1 and the compressed air supply and storage assembly, comprises further components, which will be explained in more detail below with reference to FIGS. 2 and 3.

Figure 2:
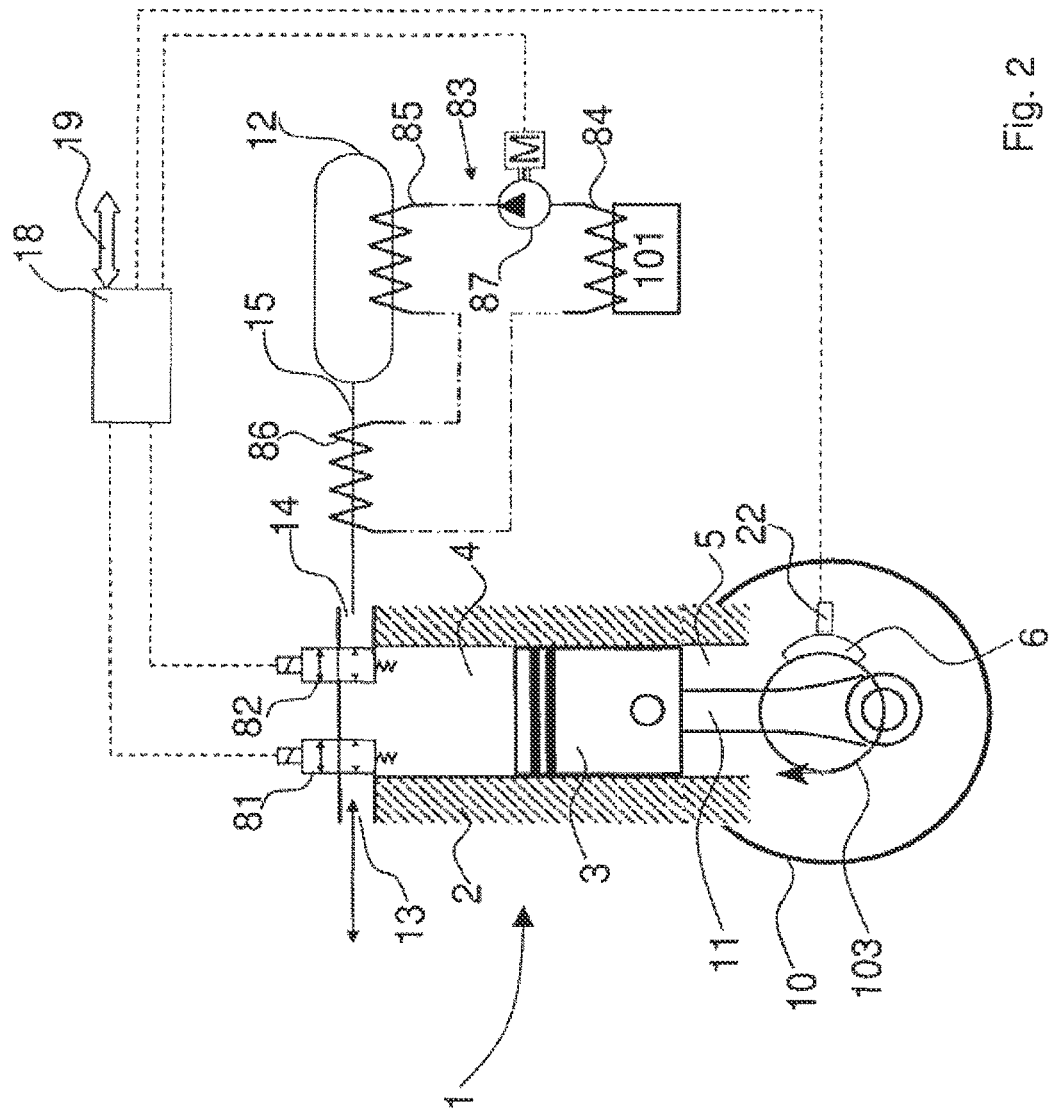
FIG. 2 depicts a single-stage air compressor, and further elements of a compressed-air system, in accordance with an embodiment of the present invention.

FIG. 2 shows the air compressor 1, which can be formed as a single- or multi-cylinder air compressor, and the compressed-air supply and storage assembly symbolized by the brake circuit compressed-air container 12. The air compressor 1 is designed as a conventional piston compressor. The air compressor 1 has a cylinder 2 and a piston 3 located therein. Below the cylinder 2, the air compressor 1 has a crankcase 10 in which a connecting rod drive for the piston 3 is provided. The connecting rod drive has a connecting rod 11 that is connected to the drive shaft 103 of the air compressor 1 and that is connected on one side to the piston 3 and on the other side to the conrod journal on the drive shaft 103. When the drive shaft 103 rotates, the piston 3 is moved in a cyclic upward and downward movement via the connecting rod drive.

The piston 3 divides the air compressor 1 into a compression chamber 4 and a crankshaft chamber, which is separated therefrom on the pressure-medium side and is connected on the pressure-medium side to the interior 5 of the crankcase 10. On a downward movement of the piston 3, the volume of the compression chamber 4 expands. The air compressor 1 is then in an expansion phase (volume enlargement phase) in which air is drawn in from the atmosphere via an inlet connection 13 and reaches the compression chamber 4 via an electrically controllable inlet valve 81.

The inlet connection 13 can also be connected or be able to be connected with a further vehicle apparatus, which already outputs precompressed air, e.g., an exhaust turbocharger. In this way, the delivery power of the air compressor 1 in a compressed-air generating mode, or the useful power that can be generated by the air compressor 1 in an expansion mode, in particular, in the third expansion mode, can be increased.

On an upward movement of the piston 3, the volume of the compression chamber 4 is reduced. The air present therein is compressed. This phase is called the compression phase (volume reduction phase). When a pressure in the compression chamber 4 is reached that is higher than the pressure in the connected brake circuit compressed-air container 12, an electrically controllable outlet valve 82 is opened. In this way, the compressed air from the compression chamber 4 is guided to an outlet connection 14 of the air compressor 1 and enters the brake circuit compressed-air container 12 via a compressed air line 15. In a compression phase, the electrically controllable inlet valve 81 is closed.

FIG. 2 also shows, as part of the pressure control device, an electronic control unit 18. The electronic control unit 18 is connected to further electronic devices in the vehicle via a data connection 19, e.g., a databus in the form of a CAN-bus. In particular, the electronic control unit 18 can be connected to an engine control unit of the drive motor of the vehicle. The electronic control unit 18 is connected to the electrically controllable inlet valve 81 and to the electrically controllable outlet valve 82, in each case via electrical lines. The electrically controllable inlet valve 81 and electrically controllable outlet valve 82 each have an opened and a closed switch position, i.e., for example, they are configured as 2/2-way valves. The electronic control unit 18 actuates the electrically controllable inlet valve 81 and the electrically controllable outlet valve 82 in a compressed-air generating mode such that in an expansion phase, the electrically controllable inlet valve 81 is opened and the electrically controllable outlet valve 82 is closed. In this way, air can be drawn in via the inlet connection 13. In a compression phase, the electronic control unit 18 closes the electrically controllable inlet valve 81 and opens the electrically controllable outlet valve 82. In this way, compressed air can be output to the outlet connection 14. The electrically controllable outlet valve 82 is advantageously only opened in a compression phase when the pressure in the compression chamber 4 is higher than in the compressed-air container connected to the outlet connection 14.

In a compressed-air expansion mode, in an expansion phase, compressed air can be conducted to the compression chamber 4 via the outlet connection 14, in that the electronic control unit 18 opens the electrically controllable outlet valve 82. The electrically controllable inlet valve 81 is then closed. In a compression phase in the compressed-air expansion mode, the electronic control unit 18 then closes the electrically controllable outlet valve 82 and opens the electrically controllable inlet valve 81. In this way, the expanded compressed air can be output to the atmosphere for example via the inlet connection 13.

Instead of the electrically controlled valves 81, 82 shown in the cylinder head of the cylinder 2 of the air compressor 1, other types of valve control can also advantageously be implemented, e.g., mechanically actuatable valves controlled via a camshaft control connected to the drive shaft 103, or externally arranged electrically actuatable valves.

FIG. 2 shows as an example a further advantageous embodiment of the invention. A heat exchange circuit 83 is provided. The heat exchange circuit 83 has a heat receiver element 84, which can be formed as a helical coil. The heat receiver element 84 is thermally coupled with the drive motor 101 or a part connected thermally therewith, e.g., an exhaust pipe. The heat exchange circuit 83 also has a first heat output element 85 coupled thermally with the brake circuit compressed-air container 12, and a second heat output element 86 coupled thermally with the compressed-air line 15. It is also possible that only one of the heat output elements 85, 86 is provided. The heat output elements 85, 86 can be constructed in a similar fashion to the heat receiving element 84. The heat receiving element 84, the first heat output element 85 and the second heat output element 86 are connected together via corresponding pipe lines. A heat transmission medium, e.g., water, is pumped through the pipe lines. For this, a pump 87, driven for example by an electric motor, is arranged in one of the pipe lines. The pump 87 can be controlled electrically by the electronic control unit 18. The electronic control unit 18 can switch the pump 87 on or off as required. Alternatively, the compressed air can also be heated directly by exhaust gas heat, i.e., without the water circuit. For this, the heat exchange circuit 83 can be configured, e.g., as a plate heat exchanger, through which the exhaust gas flows in an exhaust-gas circuit and the compressed air flows in a compressed-air circuit, which is separate from the exhaust-gas circuit. Due to the heat exchange circuit 83 described, waste heat from the drive motor 101 can be used to heat the compressed air in the compressed-air supply and storage assembly, in particular, in the brake circuit compressed-air container 12.

Figure 3:
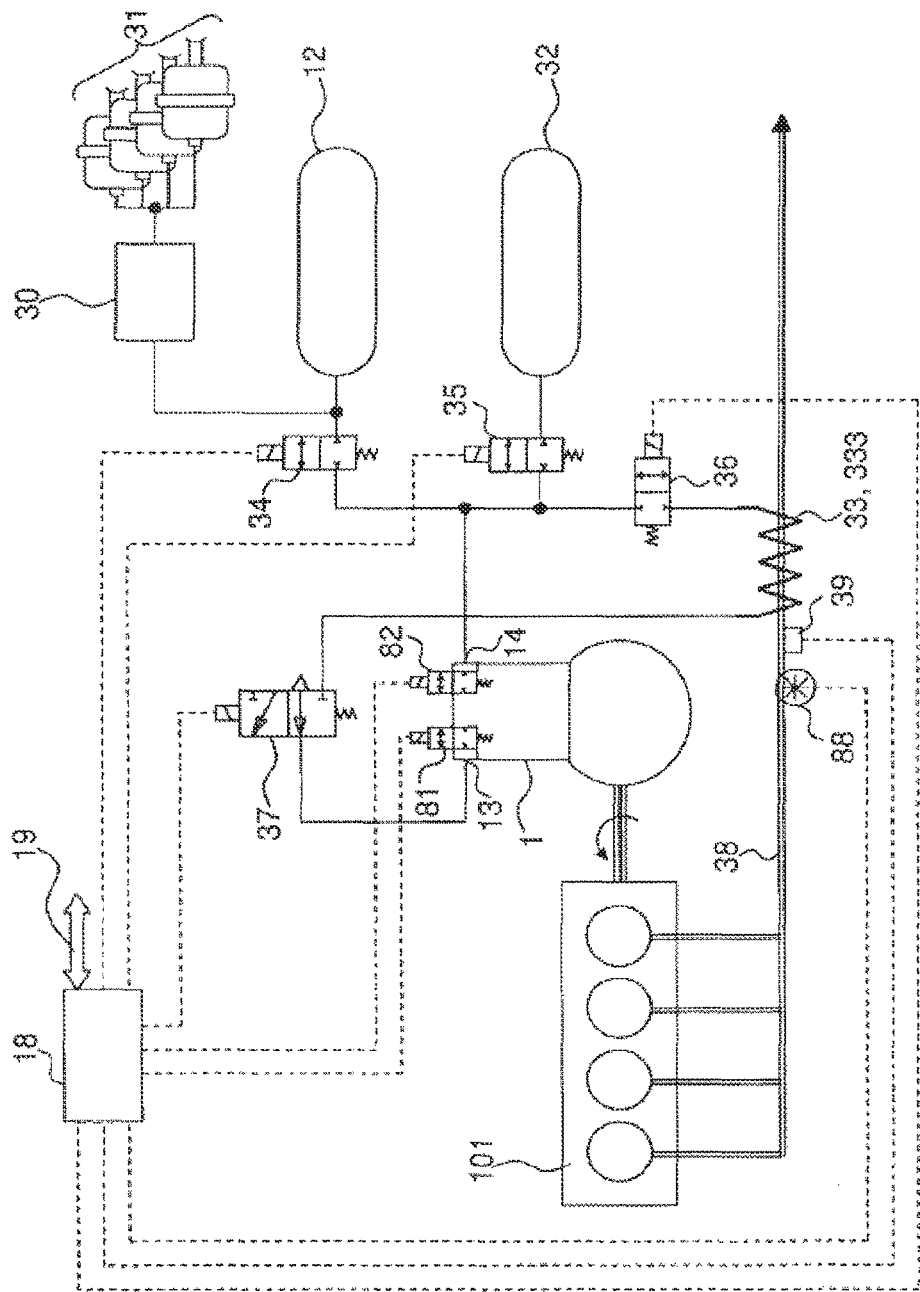
FIG. 3 shows a compressed-air system with a compressor according to FIG. 2.

FIG. 3 shows the components provided in the vehicle 100 and their interaction with further details. This shows, in particular, the compressed-air system already described with reference to FIG. 2, together with the air compressor 1 and the brake circuit compressed-air container 12. The compressed-air system furthermore has a pneumatic brake system, which, as well as the air compressor 1 and the brake circuit compressed-air container 12, comprises compressed-air brake cylinders 31 and a compressed-air control assembly 30 for controlling the supply of compressed air to the compressed-air brake cylinders 31. The compressed-air control arrangement 30 is connected to the brake circuit compressed-air container 12. The compressed air control arrangement 30 is here indicated merely diagrammatically. As well as the compressed-air supply and storage assembly, it can comprise, in particular, a brake valve, which can be actuated by means of a brake pedal, or corresponding components of an electronically controlled brake system (EBS) such as, e.g., an electric or electropneumatic brake value emitter, an electronic control unit and pneumatic valves controlled by the electronic control unit, with which a compressed-air supply to the compressed-air brake cylinder 31 is controlled.

According to FIG. 3, a second compressed-air storage container 32 is provided, which can also be formed as a compressed-air container but is provided in addition to the components of the pneumatic brake system. The second compressed-air storage container 32 provides temporary storage of compressed air, which can be generated without fuel consumption in the overrun phases of the vehicle 100, in order then to be returned to the air compressor 1 in phases with increased drive power demand, to support the drive motor 101.

FIG. 3 also shows a third compressed-air storage container 33 in the form of a heat exchanger 333. The heat exchanger 333 is thermally connected to an exhaust pipe 38 of the drive motor 101, e.g., to an exhaust pipe or exhaust manifold. The heat exchanger 333 can have a heat receiving coil, which is wound around the exhaust pipe or manifold. In this way, the waste heat emitted by the exhaust gas from the drive motor 101 is fed into the compressed air circuit via the heat exchanger 333. The heat exchanger 333 can have a structure similar to the heat output elements 85, 86 or the heat receiving element 84 discussed above.

Furthermore, FIG. 3 also shows, as electrically actuatable valves, a first electrically actuatable valve 34, a second electrically actuatable valve 35, a third electrically actuatable valve 36 and a fourth electrically actuatable valve 37, which are connected via electrical lines to the electronic control unit 18. The electronic control unit 18 has corresponding programming to actuate the electrically actuatable valves 34, 35, 36, 37 in one of the processes described herein.

The brake circuit compressed-air container 12 can be connected to or shut off from the outlet connection 14 of the air compressor 1 via the first electrically actuatable valve 34. The first electrically actuatable valve 34 is switched to the passage position by the electronic control unit 18 in the first compressed-air generating mode and in the first compressed-air expansion mode.

The second compressed-air storage container 32 can be connected to or shut off from the outlet connection 14 of the air compressor 1 via the second electrically actuatable valve 35. The second electrically actuatable valve 35 is switched to passage position by the electronic control unit 18 in the second compressed-air generating mode and in the second compressed-air expansion mode.

The heat exchanger 333 can be connected to or shut off from the outlet connection 14 of the air compressor 1 on the input side via the third electrically actuatable valve 36. The third electrically actuatable valve 36 is switched to the passage position by the electronic control unit 18 in the third compressed-air expansion mode.

The fourth electrically actuatable valve 37 serves for switching the inlet connection 13 of the air compressor 1 between a connection to atmosphere and an output-side connection of the heat exchanger 333. In the switch position of the fourth electrically actuatable valve 37 shown in FIG. 3, the inlet connection 13 is connected to atmosphere.

Instead of being connected to atmosphere, the fourth electrically actuatable valve 37 can also connect the inlet connection 13 to another vehicle apparatus that already outputs precompressed air, e.g., the exhaust turbocharger. In this way, the delivery power of the air compressor 1 in a compressed-air generating mode, or the useful power that can be generated by the air compressor 1 in an expansion mode, in particular, in the third expansion mode, can be increased.

Alternatively, the fourth electrically actuatable valve 37 can also be arranged downstream of the outlet connection 14 of the air compressor 1, in order at this point to connect the input side and output side of the heat exchanger 333 alternately to the outlet connection 14 of the air compressor 1. A further embodiment provides that the fourth electrically actuatable valve 37 can be integrated in the cylinder head of the air compressor 1 as an additional switchable valve.

When the fourth electrically actuatable valve 37 is actuated by the electronic control unit 18, in the embodiment shown in FIG. 3, the inlet connection 13 is connected to the output side of the heat exchanger 333. In the third compressed-air expansion mode, therefore, the fourth electrically actuatable valve 37 is actuated by the electronic control unit 18. Otherwise the switch position shown in FIG. 3 is retained.

Furthermore, the air supply to the compression chamber 4 and the air outlet from the compression chamber 4 are controlled, in the manner already described with reference to FIG. 2, via the electrically controllable inlet valve 81 and the electrically controllable outlet valve 82 of the air compressor 1.

In the first and second compressed-air generating mode, the fourth electrically actuatable valve 37 is in the inactivated position shown in FIG. 3. Here, the inlet connection 13 is connected to atmosphere. By corresponding control of the electrically controllable inlet valve 81 and electrically controllable outlet valve 82 in a manner adapted to the compression and expansion phases of the air compressor 1, compressed air is generated at the outlet connection 14. In the first compressed-air generating mode, by opening the first electrically actuatable valve 34, the compressed air is fed into the brake circuit compressed-air container 12. In the second compressed-air generating mode, by opening the second electrically actuatable valve 35, the compressed air is fed into the second compressed-air storage container 32.

Furthermore, a refill mode can be provided in which compressed air can be taken directly from the second compressed-air storage container 32 and fed into the brake circuit compressed-air container 12, e.g., when the pressure in the brake circuit compressed-air container 12 has become too low. In this case, the electronic control unit 18 switches both the first electrically actuatable valve 34 and the second electrically actuatable valve 35 to the passage position.

According to FIG. 3, furthermore, a temperature sensor 39 is arranged on the exhaust pipe 38 to detect the temperature of the exhaust pipe or the waste heat generated. An exhaust gas quantity sensor 88 is also provided via which the quantity of exhaust gas emitted is detected. The temperature sensor 39 and the exhaust gas quantity sensor 88 are connected to the electronic control unit 18 via electrical lines. The electronic control unit 18 analyzes the signals from the sensors and, from this, determines suitable phases in the operation of the vehicle 100 in which the recirculation mode, wherein compressed air is guided through the heat exchanger 333, is energetically useful. If the installation complexity in the vehicle is to be kept low, the temperature sensor 39 and exhaust gas quantity sensor 88 may be omitted. In this case, the electronic control unit 18 can calculate the exhaust gas temperature and quantity from a map stored in memory.

In the system shown in FIG. 3, in addition, the heat exchange circuit 33 described with reference to FIG. 2 can also be provided, in whole or in part. Such a heat exchange circuit can, for example, be provided for heating the compressed air in the brake circuit compressed-air container 12. Also, the heat exchange circuit can be provided for heating the compressed air at the second compressed-air storage container 32. This further improves the energy balance of the vehicle 100.

Figure 4:
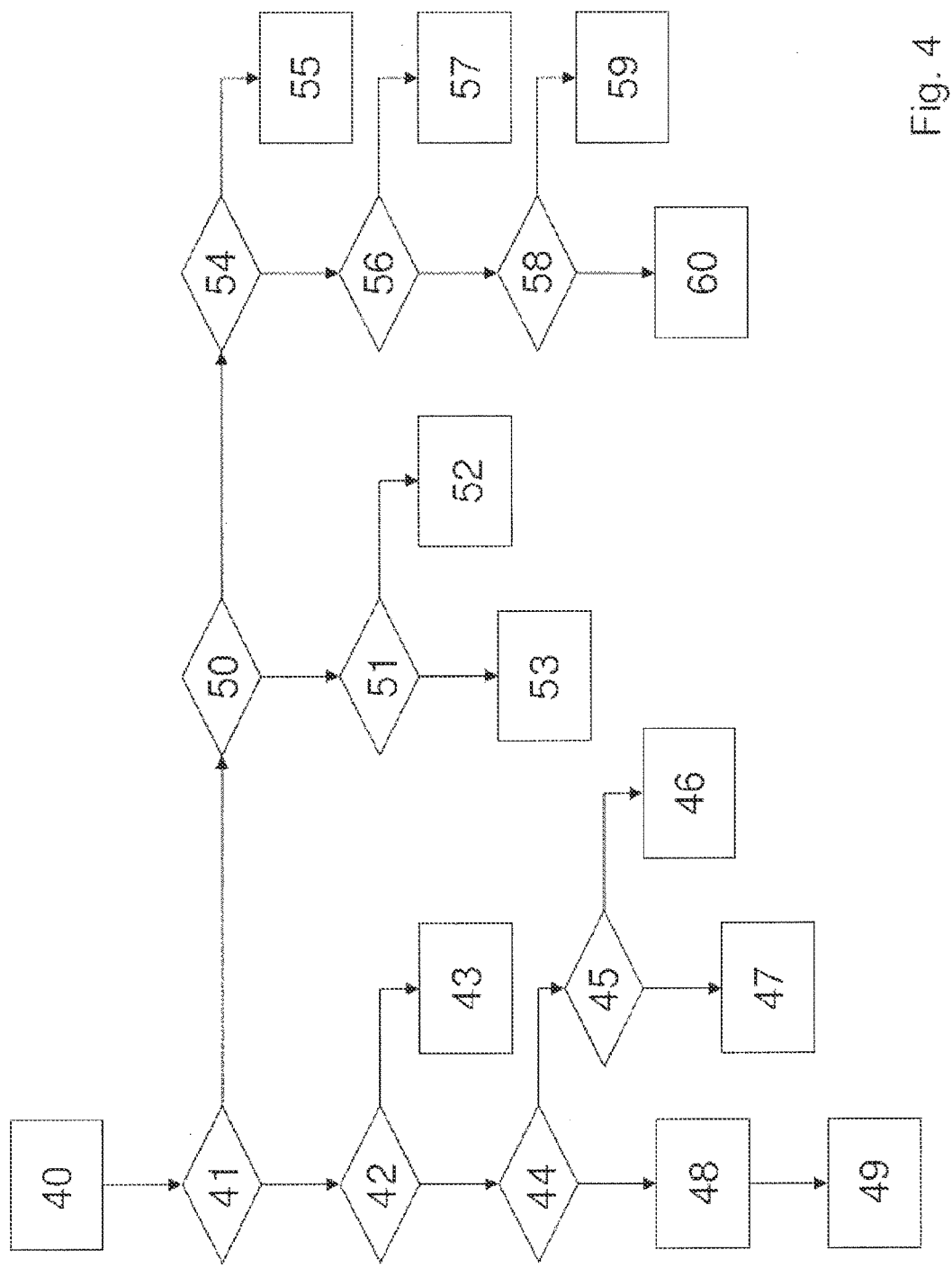
FIGS. 4 and 5 are flow diagrams illustrating process steps according to embodiments of the present invention.

FIG. 4 shows details of the process steps controlled by the electronic control unit 18 in more depth.

In principle, the procedure is divided into two branches, which are executed depending on the drive power demand or the presence of an overrun phase of the vehicle 100. Blocks 40 to 49 according to FIG. 4 are associated with an operating mode of the vehicle 100 in which there is an above-average demand for drive power, e.g., on climbing hills steeper than a specific gradient, or when the vehicle has a correspondingly high load, or on rapid acceleration.

Blocks 50 to 53 concern overrun phases in operation of the vehicle 100. In these phases, no drive power is required; rather, because of the overrun operation, energy can be recovered.

Blocks 54 to 60 concern an operation of the vehicle in which no overrun phase is present, but a specific drive power of the drive motor 101 is still required. The drive power required here is however less than in blocks 40 to 49. An example for branching to blocks 54 to 60 would be operation of the vehicle on a substantially flat road section with substantially constant drive speed.

The procedure according to FIG. 4 begins with block 40. Here, the drive motor of the vehicle 100 is started, which drives the air compressor 1.

Then, in block 41, a determination is made as to whether there is an increased demand for drive power. This can be established from the increased torque demand from the vehicle. For example, the engine torque of the drive motor 101 transmitted via the data connection 19 can be compared with a threshold value. If this threshold value is exceeded, the procedure continues with block 42. In block 42, a determination is made as to whether the brake circuit compressed-air container 12 has a pressure that lies below a predefined minimum value. If this is the case, the procedure branches to block 43. In block 43, the first compressed-air generating mode is activated. Here, the air compressor 1 then fills the brake circuit compressed-air container 12 with compressed air.

The criteria used to determine in block 42 whether or not the first compressed-air generating mode is to be initiated may be made dependent on further parameters. Thus, the topology of the road section ahead, for example uphill or downhill sections, can be taken into account, as can a foreseeable duration until the next overrun phase, the length of the overrun phase and further traffic circumstances, e.g., the need to stop the vehicle due to traffic lights or congestion. From these criteria, for example, the threshold used for the predefined minimum pressure can be adapted, e.g., raised or lowered.

If the condition in block 42 is not fulfilled, the procedure continues with block 44. Here, a determination is made as to whether the second compressed-air storage container 32 has a pressure that lies below a nominal minimum pressure. If this is the case, the second compressed-air storage container 32 is currently not suitable for feeding compressed air into the air compressor 1 for supporting the drive motor 101. Therefore, the procedure branches to block 45 in which a determination is made as to whether the third compressed-air expansion mode, i.e., recirculation operation through the heat exchanger 333, is energetically useful. By means of the signals emitted by the temperature sensor 39 and the exhaust gas quantity sensor 88, the control unit 18 checks whether an adequate exhaust gas temperature and adequate exhaust gas quantity are present. If this is not the case, the procedure branches to block 46. Here, recirculation mode is not initiated. Instead, the electrically controllable inlet valve 81, the electrically controllable outlet valve 82 and the fourth electrically controllable valve 37 are set by the electronic control unit 18 to an idle position, which ensures that the air compressor 1 runs at so-called "idle" with the drive motor 101 and draws as little energy as possible from the drive motor 101. The idle position can entail switching the electrically controllable inlet valve 81 to the passage position. In this case, the compression chamber 4 of the air compressor 1 is permanently connected to atmosphere via the fourth electrically actuatable valve 37, which finally leads to the compression chamber 4 being pressure-free. Where applicable, also, the electrically controllable outlet valve 82 can be switched to the passage position in order to further relieve the load on the compression chamber. Insofar as a switchable coupling is provided between the air compressor 1 and the drive motor 101, the air compressor 1 can also be decoupled from the drive motor 101.

If the check in block 45 gives a positive result, the procedure branches from block 45 to block 47. In block 47, recirculation mode is activated, i.e., compressed air is pumped through the heat exchanger 333 and supplied directly back to the air compressor 1 in expansion phases.

If the check in block 44 gives a negative result, the procedure branches from block 44 to block 48. In block 48, the air is heated in the second compressed-air storage container 32. Heating can take place, for example, via a separate heat exchange circuit allocated to the second compressed-air storage container 32, similar to the heat exchange circuit 83 in FIG. 2. The compressed air is then supplied to the air compressor 1 via the outlet connection 14, wherein the electrically actuatable outlet valve 82 is switched to passage in the expansion phase.

Alternatively or additionally, the compressed air can also be heated by conducting compressed air from the second compressed-air storage container 32 through the heat exchanger 333 via the second electrically actuatable valve 35 and the third electrically actuatable valve 36. The compressed air is then supplied to the air compressor 1 at the inlet connection 13 via the fourth electrically actuatable valve 37.

Alternatively, the compressed air can be supplied directly, i.e., without heating, from the second compressed-air storage container 32 to the air compressor 1. The compressed air is then supplied to the air compressor 1 via the outlet connection 14, wherein the electrically actuatable outlet valve 82 is switched to passage in the expansion phase.

In block 49 following block 48, the compressed air is then supplied, where applicable previously heated, from the second compressed-air storage container 32 to the compression chamber 4 of the air compressor 1 in expansion phases.

Insofar as the condition checked in block 41 is not fulfilled, the procedure continues with block 50. Here, a determination is made as to whether there is a deceleration request from the vehicle. This can, for example, be determined using the engine torque received via the data connection 19. If the engine torque received is less than zero, a deceleration request exists. The vehicle is then in an overrun phase. If an overrun phase is present, the procedure branches from block 50 to block 51. In block 51, a determination is made as to whether the brake circuit compressed-air container 12 already has a pressure that corresponds to a maximum value or, where applicable, lies slightly above this. In this case, no further compressed air filling of the brake circuit compressed-air container 12 is required. If, however, this is not the case, the procedure branches from block 51 to block 52. There, the first compressed-air generating mode is activated. Otherwise, it branches from block 51 to block 53. There, the second compressed-air generating mode is activated. In this way, the surplus energy present in the overrun phase is used to fill the second compressed-air storage container 32.

The criteria used in block 51 to decide whether or not the brake circuit compressed-air container 12 should be filled with compressed air, may—like the criteria explained in relation to block 42—be made dependent on the topology of the road section ahead, the duration until the next overrun phase, the length of the overrun phase and other traffic circumstances (traffic lights, congestion, etc.).

If the check in block 50 gives a negative result, the procedure branches from there to block 54. There, a determination is made as to whether the brake circuit compressed-air container 12 already has a pressure that corresponds to a maximum value or, where applicable, lies slightly above this. In block 54, for example, the same check can be carried out as in block 51. If the result of the check is negative, the procedure branches to block 55. Here, the first compressed-air generating mode is activated. If the check in block 54 is positive, the procedure branches from there to block 56. There, a determination is made as to whether the pressure in the second compressed-air storage container 32 has already reached or exceeded a maximum pressure threshold. If this is not the case, the procedure branches to block 57. There, the second compressed-air generating mode is activated. Otherwise, it branches from block 56 to block 58. There, the criteria necessary for initiating recirculation mode are checked, namely the criteria previously discussed with reference to block 45. If the conditions for recirculation mode are not fulfilled, the procedure branches from block 58 to block 59. Block 59 corresponds in function to block 46. Otherwise, it branches from block 58 to block 60. Block 60 corresponds in function to block 47. There, again, the recirculation mode is activated.

Figure 5:
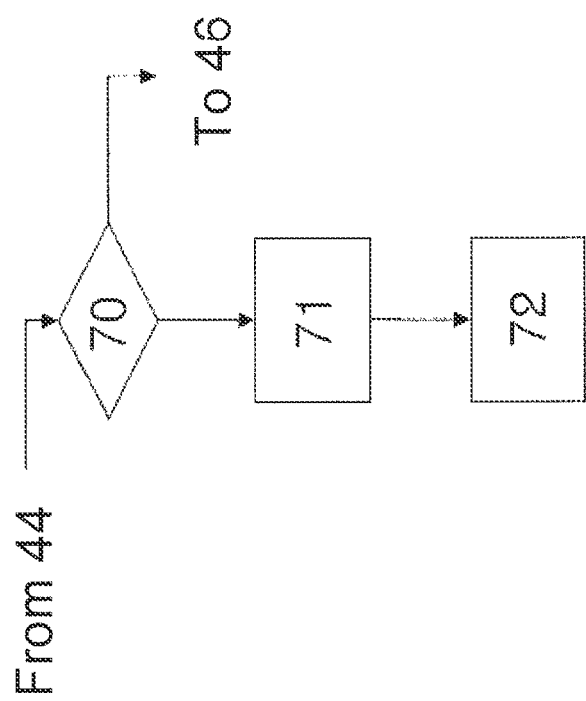

FIG. 5 shows an advantageous additional possibility for the procedure steps in FIG. 4. The starting point is block 44 in FIG. 4. From here, where the result of the check in block 44 is positive, the procedure does not branch directly to block 45, but first to block 70. There, a determination is made as to whether the brake pressure compressed-air container 12 has a pressure that lies below a pressure value necessary for initiation of the first compressed-air expansion mode. If this is the case, the first compressed-air expansion mode, in which compressed air is taken from the brake circuit compressed-air container to support the drive motor 101, is not initiated. Therefore, in this case, the procedure branches to block 45 according to FIG. 4. From there, the procedure continues according to FIG. 4.

If, however, the pressure in the brake pressure compressed-air container 12 is sufficiently high, the procedure branches from block 70 to block 71. There, the air in the brake circuit compressed-air container is heated either by the heat exchange circuit 83 as shown in FIG. 2 or by conduction of the compressed air through the heat exchanger 333. Alternatively, the compressed air from the brake circuit compressed-air container 12 can also be used directly without heating. The compressed air is then supplied to the air compressor 1 via the outlet connection 14, wherein the electrically actuatable outlet valve 82 is switched to passage in the expansion phase. In the case where the compressed air is conducted through the heat exchanger 333, the compressed air is guided from the brake circuit compressed-air container 12 through the heat exchanger 333 via the first electrically actuatable valve 34 and the third electrically actuatable valve 36, and then supplied to the air compressor 1 at the inlet connection 13 via the fourth electrically actuatable valve 37.

In block 72 following block 71, the compressed air from the brake circuit compressed-air container 12—where applicable, heated—is conducted to the compression chamber 4 of the air compressor 1 in the expansion phases. Here, the first compressed-air expansion mode is present.

FIG. 6 shows a two-stage compression process with reference to a three-cylinder air compressor 61. The diagram shows a first piston/cylinder arrangement 62, a second piston/cylinder arrangement 63 and a third piston/cylinder arrangement 64. The first and second piston/cylinder arrangements 62, 63 form a first compression stage. The third piston/cylinder arrangement 64 forms a second compression stage. In an expansion phase, an air flow is drawn into the first compression stage, as indicated by arrow 65. In a compression phase, air compressed in the first compression stage is output at a first pressure level, as shown in FIG. 6 by arrow 66. This compressed air is conducted through a cooler 67. The cooler 67 can be a water cooler integrated in the cylinder head of an air compressor. The compressed air emerging from the cooler 67 is supplied to the second compression stage, i.e., the third piston/cylinder arrangement 64, as indicated by the arrow 68. In a compression phase, the second compression stage outputs compressed air at a second pressure level, as shown by arrow 69. The second pressure level is higher than the first pressure level. Because of the cooler 67, an at least almost isothermic two-stage compression can be implemented, which guarantees a particularly high efficiency of operation of the three-cylinder air compressor 61 both in the compressed-air generating modes and in the compressed-air expansion modes. The efficiency is especially high in the third compressed-air expansion mode in particular.

It will thus be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall there-between.

What is claimed is:

1. A method for controlling pressure in a vehicle, the vehicle including
    a drive motor to generate drive power of the vehicle, and
    a pneumatic brake system for braking the vehicle, the pneumatic brake system including
        compressed-air brake cylinders,
        a compressed-air supply and storage assembly having at least one first compressed-air storage container in the form of a brake circuit compressed-air container from which at least one compressed-air brake cylinder is pressurized with compressed air on braking of the vehicle, and
        an air compressor coupleable with the drive motor,
    the method comprising:
    in a first compressed-air generating mode, conducting compressed air generated in compression phases of the air compressor from a compression chamber of the air compressor into the at least one brake circuit compressed-air container;
    in a first compressed-air expansion mode, in expansion phases of the air compressor, conducting compressed air from the at least one brake circuit compressed-air container to the compression chamber of the air compressor; and
    at least one
        (i) in a second compressed-air expansion mode, in expansion phases of the air compressor, conducting compressed air from a second compressed-air storage container into the compression chamber of the air compressor, and
        (ii) in a third compressed-air expansion mode, in expansion phases of the air compressor, conducting compressed air from a third compressed-air storage container into the compression chamber of the air compressor.

2. The method as claimed in claim 1, further comprising, in a first overrun phase in operation of the vehicle, operating the air compressor in the first compressed-air generating mode.

3. The method as claimed in claim 1, further comprising, in a second compressed-air generating mode, conducting compressed air generated in compression phases of the air compressor from the compression chamber of the air compressor into the second compressed-air storage container.

4. The method as claimed in claim 3, further comprising, in a second overrun phase in operation of the vehicle, operating the air compressor in the second compressed-air generating mode.

5. The method as claimed in claim 3, wherein operation in the second compressed-air generating mode is effected only when one of (i) a predefined minimum pressure is present in the at least one brake circuit compressed-air container and (ii) the at least one brake circuit compressed-air container is filled to maximum pressure.

6. The method as claimed in claim 3, further comprising, in the second compressed-air generating mode, when pressure in the second compressed-air storage container one of reaches and exceeds a maximum pressure threshold, determining based on at least one of satellite navigation information and digital map data whether, for a road section immediately ahead, a current overrun phase will persist for a minimum duration, and when it is determined that the current overrun phase will persist for a minimum duration, continuing operation of the air compressor in the second compressed-air generating mode until one of (i) the current overrun phase ends and (ii) pressure in the second compressed-air storage container one of reaches and exceeds an upper limit pressure threshold above the maximum pressure threshold.

7. The method as claimed in claim 1, wherein the second compressed-air storage container is an additional compressed-air container decoupled from the at least one brake circuit compressed-air container.

8. The method as claimed in claim 1, wherein the third compressed-air storage container is a heat exchanger, and further comprising, in the third compressed-air expansion mode on an input side filling the heat exchanger with compressed air output from the air compressor in the compression phases, and on an output side supplying heated compressed air back to the compression chamber of the air compressor in the expansion phases.

9. The method as claimed in claim 1, further comprising generating via multistage compression compressed air output from the air compressor on an output side in the compression phases.

10. The method as claimed in claim 9, further comprising conducting compressed air through a cooler between at least two compression stages of the multistage compression process to reduce the temperature of the compressed air.

11. The method as claimed in claim 1, wherein operation in the third compressed-air expansion mode is effected only when one of (i) a predefined minimum pressure is present in the at least one brake circuit compressed-air container and (ii) the at least one brake circuit compressed-air container is filled to maximum pressure.

12. The method as claimed in claim 1, wherein operation in the third compressed-air expansion mode is effected only when one of (i) a predefined minimum pressure is present in the second compressed-air storage container and (ii) the second compressed-air storage container is filled to maximum pressure.

13. The method as claimed in claim 1, further comprising, in a phase with a demand for drive power in operation of the vehicle, activating one of (i) the first compressed-air expansion mode, (ii) the second compressed-air expansion mode and (iii) the third compressed-air expansion mode, wherein the second compressed-air expansion mode is activated before the first compressed-air expansion mode, and the second compressed-air expansion mode is activated before the third compressed-air expansion mode.

14. The method as claimed in claim 1, further comprising, when pressure in the at least one brake circuit compressed-air container one of reaches and falls below a minimum pressure threshold, before initiating the first compressed-air generating mode, determining based on at least one of satellite navigation information and digital map data whether, on the basis of a road section immediately ahead, an impending overrun phase in operation of the vehicle is presented and, when an impending overrun phase is detected, delaying initiation of the first compressed-air generating mode until the impending overrun phase occurs.

15. The method as claimed in claim 14, interrupting delayed initiation of the first compressed-air generating mode and initiating the first compressed-air generating mode when pressure in the at least one brake circuit compressed-air container one of reaches and falls below a lower limit pressure threshold below the minimum pressure threshold.

16. A pressure control device for a vehicle, the vehicle including
a drive motor to generate drive power, and
a pneumatic brake system for braking the vehicle, the pneumatic brake system including
compressed-air brake cylinders,
a compressed-air supply and storage assembly having at least one first compressed-air storage container in the form of a brake circuit compressed-air container from which at least one compressed-air cylinder is pressurized with compressed air on braking of the vehicle, and
an air compressor coupleable with the drive motor,
the pressure control device comprising: at least one electronic control unit and at least one valve device controllable by the electronic control unit for controllable connection of a compression chamber of the air compressor to the at least one brake circuit compressed-air container and to at least one of a second compressed-air storage container and a third compressed-air storage container, the electronic control unit including a control program adapted to perform the method as claimed in claim 1.

17. A method for pressure control in a vehicle, the vehicle including
a drive motor to generate drive power,
an air compressor coupleable with the drive motor, and
a heat exchanger pneumatically connectable to the air compressor,
the method comprising:
filling the heat exchanger on an input side with compressed air output by the air compressor in compression phases; and, on an output side of the heat exchanger, supplying heated compressed air back to a compression chamber of the air compressor in expansion phases.

18. A pressure control device for a vehicle equipped with a pneumatic brake system, the vehicle including
a drive motor for generating drive power,
an air compressor coupleable with the drive motor, and
a heat exchanger pneumatically connectable with the air compressor,
the pressure control device comprising: at least one electronic control unit and at least one valve device controllable by the electronic control unit for controllable connection of a compression chamber of the air compressor to the heat exchanger, the electronic control unit including a control program adapted to perform the method as claimed in claim 17.

* * * * *